United States Patent
Shin et al.

(10) Patent No.: US 10,818,916 B2
(45) Date of Patent: Oct. 27, 2020

(54) POSITIVE ELECTRODE ACTIVE MATERIAL FOR SECONDARY BATTERY AND SECONDARY BATTERY INCLUDING THE SAME

(71) Applicant: LG Chem, Ltd., Seoul (KR)

(72) Inventors: Ju Kyung Shin, Daejeon (KR); Wang Mo Jung, Daejeon (KR); Byung Chun Park, Daejeon (KR); Ji Hoon Ryu, Daejeon (KR); Sang Min Park, Daejeon (KR); Sang Wook Lee, Daejeon (KR)

(73) Assignee: LG Chem, Ltd. (KR)

( * ) Notice: Subject to any disclaimer, the term of this patent is extended or adjusted under 35 U.S.C. 154(b) by 300 days.

(21) Appl. No.: 15/753,844

(22) PCT Filed: Nov. 30, 2016

(86) PCT No.: PCT/KR2016/013952
§ 371 (c)(1),
(2) Date: Feb. 20, 2018

(87) PCT Pub. No.: WO2017/095134
PCT Pub. Date: Jun. 8, 2017

(65) Prior Publication Data
US 2018/0287135 A1    Oct. 4, 2018

(30) Foreign Application Priority Data

Nov. 30, 2015  (KR) .......... 10-2015-0168668
Nov. 29, 2016  (KR) .......... 10-2016-0160507

(51) Int. Cl.
| | | |
|---|---|---|
| *H01M 4/36* | (2006.01) | |
| *H01M 4/505* | (2010.01) | |
| *H01M 4/525* | (2010.01) | |
| *C01G 53/00* | (2006.01) | |
| *H01M 10/052* | (2010.01) | |
| *H01M 4/1391* | (2010.01) | |
| *H01M 4/04* | (2006.01) | |
| *H01M 2/10* | (2006.01) | |
| *H01M 4/131* | (2010.01) | |
| *H01M 10/0525* | (2010.01) | |
| *H01M 4/02* | (2006.01) | |

(52) U.S. Cl.
CPC .......... *H01M 4/366* (2013.01); *C01G 53/006* (2013.01); *C01G 53/50* (2013.01); *H01M 2/10* (2013.01); *H01M 4/0471* (2013.01); *H01M 4/131* (2013.01); *H01M 4/1391* (2013.01); *H01M 4/505* (2013.01); *H01M 4/525* (2013.01); *H01M 10/052* (2013.01); *H01M 10/0525* (2013.01); *C01P 2004/03* (2013.01); *C01P 2004/61* (2013.01); *C01P 2004/86* (2013.01); *C01P 2006/12* (2013.01); *C01P 2006/40* (2013.01); *H01M 2004/021* (2013.01); *H01M 2004/028* (2013.01)

(58) Field of Classification Search
CPC ...... H01M 4/366; H01M 4/131; H01M 4/505; H01M 4/525; H01M 4/1391; H01M 4/0471; H01M 10/0525; H01M 10/052; H01M 2004/028; H01M 2004/021; C01G 53/50; C01G 53/006; C01P 2004/86; C01P 2004/61; C01P 2004/03; C01P 2006/12; C01P 2006/40
See application file for complete search history.

(56) References Cited

U.S. PATENT DOCUMENTS

| | | |
|---|---|---|
| 2004/0200998 A1 | 10/2004 | Park et al. |
| 2009/0068561 A1 | 3/2009 | Sun et al. |
| 2010/0209771 A1 | 8/2010 | Shizuka et al. |
| 2012/0064408 A1 | 3/2012 | Song et al. |
| 2012/0276446 A1 | 11/2012 | Kawai |

(Continued)

FOREIGN PATENT DOCUMENTS

| | | |
|---|---|---|
| CN | 101796672 A | 8/2010 |
| CN | 103620833 A | 3/2014 |

(Continued)

OTHER PUBLICATIONS

Extended European Search Report including Written Opinion for Application No. EP16871030.9 dated Jun. 26, 2018.

(Continued)

*Primary Examiner* — Laura Weiner
(74) *Attorney, Agent, or Firm* — Lerner, David, Littenberg, Krumholz & Mentlik, LLP

(57) ABSTRACT

Provided are a positive electrode active material for a secondary battery which may exhibit excellent capacity and life characteristics when used in the battery by including a core, and a surface treatment layer disposed on a surface of the core, wherein the core is a secondary particle including a plurality of primary particles, the primary particles include a polycrystalline lithium composite metal oxide of Formula 1 having an average grain diameter of 50 nm to 200 nm, and the surface treatment layer includes a lithium oxide including lithium and at least one metal selected from the group consisting of boron (B), tungsten (W), hafnium (Hf), niobium (Nb), tantalum (Ta), molybdenum (Mo), silicon (Si), tin (Sn), and zirconium (Zr), and a secondary battery including the same, $$Li_aNi_{1-x-y}Co_xM1_yM3_zM2_wO_2 \quad \text{[Formula 1]}$$

(in Formula 1, M1, M2, M3, a, x, y, z, and w are the same as those defined in the specification).

16 Claims, No Drawings

(56) References Cited

U.S. PATENT DOCUMENTS

| | | |
|---|---|---|
| 2014/0045067 A1 | 2/2014 | Cho et al. |
| 2014/0072874 A1 | 3/2014 | Kim et al. |
| 2014/0099545 A1 | 4/2014 | Cho et al. |
| 2014/0158932 A1 | 6/2014 | Sun et al. |
| 2015/0030927 A1 | 1/2015 | Kwak et al. |
| 2015/0171424 A1* | 6/2015 | Kawai ............... H01M 4/366 429/223 |
| 2015/0357627 A1 | 12/2015 | Kwak et al. |
| 2015/0357638 A1 | 12/2015 | Sun et al. |
| 2016/0013471 A1 | 1/2016 | Kaseda et al. |
| 2016/0013476 A1 | 1/2016 | Oh et al. |
| 2016/0028077 A1 | 1/2016 | Kwak et al. |
| 2017/0062871 A1 | 3/2017 | Urata et al. |

FOREIGN PATENT DOCUMENTS

| | | |
|---|---|---|
| CN | 104521039 A | 4/2015 |
| CN | 104781960 A | 7/2015 |
| CN | 104903238 A | 9/2015 |
| CN | 104904043 A | 9/2015 |
| CN | 104995769 A | 10/2015 |
| JP | 2009525578 A | 7/2009 |
| JP | 2012238581 A | 12/2012 |
| JP | 2013137947 A | 7/2013 |
| KR | 20030083476 A | 10/2003 |
| KR | 20060130964 A | 12/2006 |
| KR | 20120026822 A | 3/2012 |
| KR | 20130138147 A | 12/2013 |
| KR | 20140044594 A | 4/2014 |
| KR | 20150013077 A | 2/2015 |
| WO | 2009031619 A1 | 3/2009 |
| WO | 2014133063 A1 | 9/2014 |
| WO | 2015129188 A1 | 9/2015 |

OTHER PUBLICATIONS

Search report from International Application No. PCT/KR2016/013952, dated Mar. 7, 2017.

Chinese Search Report for Application No. 201680051337.2, dated Jul. 17, 2020, pp. 1-3.

* cited by examiner

POSITIVE ELECTRODE ACTIVE MATERIAL FOR SECONDARY BATTERY AND SECONDARY BATTERY INCLUDING THE SAME

CROSS-REFERENCE TO RELATED APPLICATIONS

The present application is a national phase entry under 35 U.S.C. § 371 of International Application No. PCT/KR2016/013952, filed Nov. 30, 2016 which claims priority from Korean Patent Application No. 10-2015-0168668, filed on Nov. 30, 2015 and Korean Patent Application No. 10-2016-0160507, filed on Nov. 29, 2016, the disclosures of which are incorporated herein by reference.

TECHNICAL FIELD

The present invention relates to a positive electrode active material for a secondary battery, which may exhibit excellent capacity and life characteristics, and a secondary battery including the same.

BACKGROUND ART

Demand for secondary batteries as an energy source has been significantly increased as technology development and demand with respect to mobile devices have increased. Among these secondary batteries, lithium secondary batteries having high energy density, high voltage, long cycle life, and low self-discharging rate have been commercialized and widely used.

However, lithium secondary batteries have limitations in that lifetime rapidly decreases as charge and discharge are repeated. In particular, these limitations are more serious at high temperature. The reason for this is due to a phenomenon that occurs when an electrolyte is decomposed or an active material is degraded due to moisture in the battery or other effects, and the internal resistance of the battery increases.

Accordingly, a positive electrode active material for a lithium secondary battery, which has been actively researched and developed and is currently being used, is layer-structured $LiCoO_2$. Since $LiCoO_2$ has excellent life characteristics and charge and discharge efficiency, the $LiCoO_2$ is the most widely used, but there is a limitation in using the $LiCoO_2$ in high-capacity battery technology due to low structural stability.

As a positive electrode active material alternative to $LiCoO_2$, various lithium transition metal oxides, such as $LiNiO_2$, $LiMnO_2$, $LiMn_2O_4$, $LiFePO_4$, and $Li(Ni_xCo_yMn_z)O_2$, have been developed. Among these oxides, with respect to $LiNiO_2$, it is advantageous in that $LiNiO_2$ exhibits battery characteristics of high discharge capacity. However, the synthesis of the $LiNiO_2$ may be difficult by a simple solid phase reaction, and thermal stability and cycle characteristics may be low. Also, a lithium manganese-based oxide, such as $LiMnO_2$ or $LiMn_2O_4$, is advantageous in that its thermal stability is excellent and the price is low. However, the lithium manganese-based oxide may have low capacity and poor high-temperature characteristics. Particularly, with respect to $LiMn_2O_4$, some have been commercialized as low-cost products, but life characteristics were poor due to structural distortion (Jahn-Teller distortion) caused by $Mn^{+3}$. Furthermore, since $LiFePO_4$ is inexpensive and has excellent stability, a significant amount of research has currently been conducted for the application of $LiFePO_4$ for a hybrid electric vehicle (HEV). However, the application to other areas may be difficult due to low conductivity.

Thus, a lithium nickel manganese oxide containing an excessive amount of lithium, i.e., $Li_{a1}(Ni_{x1}Co_{y1}Mn_{z1})_{2-a1}O_2$ (where, a1, x1, y1, and z1 each independently are an atomic fraction of oxide composition elements, wherein $1<a1\leq1.5$, $0<x1\leq1$, $0<y1\leq1$, $0<z1\leq1$, and $0<x1+y1+z1\leq1$), is a material which is currently very much in the spotlight as a positive electrode active material alternative to $LiCoO_2$. This material is less expensive than $LiCoO_2$ and may be used in high voltage and high capacity applications, but has limitations in that rate capability and life characteristics at high temperature may be poor.

In a case in which impurities are present on a surface of the positive electrode active material during an electrode preparation process of a lithium secondary battery, it may affect aging in a preparation step of an electrode slurry in the electrode preparation process of the lithium secondary battery. In addition, the impurities may react with an electrolyte solution injected into the lithium secondary battery to cause a swelling phenomenon in the lithium secondary battery.

In order to address these limitations, various methods of coating the surface of the positive electrode active material or removing the impurities present on the surface of the positive electrode active material have been proposed, but the above-described limitations have not been satisfactorily addressed.

Thus, development of a positive electrode active material, which may improve lithium secondary battery performance while addressing the above limitations, is urgently required.

DISCLOSURE OF THE INVENTION

Technical Problem

An aspect of the present invention provides a positive electrode active material for a secondary battery, which may exhibit excellent capacity and life characteristics through a surface treatment of a core including a polycrystalline lithium composite metal oxide.

Another aspect of the present invention provides a positive electrode for a secondary battery, a lithium secondary battery, a battery module, and a battery pack which include the positive electrode active material.

Technical Solution

According to an aspect of the present invention, there is provided a positive electrode active material for a secondary battery including: a core; and a surface treatment layer disposed on a surface of the core, wherein the core is a secondary particle including a plurality of primary particles, the primary particles include a polycrystalline lithium composite metal oxide of Formula 1 having an average grain diameter of 50 nm to 200 nm, and the surface treatment layer includes a lithium oxide including lithium; and at least one metal selected from the group consisting of boron (B), tungsten (W), hafnium (Hf), niobium (Nb), tantalum (Ta), molybdenum (Mo), silicon (Si), tin (Sn), and zirconium (Zr):

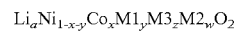  [Formula 1]

(in Formula 1, M1 includes at least one selected from the group consisting of aluminum (Al) and manganese (Mn), M2 includes at least one element selected from the group consisting of Zr, titanium (Ti), magnesium (Mg), Ta, and Nb, M3 includes at least one element selected from the group consisting of W, Mo, and chromium (Cr), 1.0≤a≤1.5, 0<x≤0.5, 0<y≤0.5, 0.002≤z≤0.03, 0≤w≤0.02, and 0<x+y≤0.7).

According to another aspect of the present invention, there is provided a method of preparing the positive electrode active material for a secondary battery including:

preparing a core including a polycrystalline lithium composite metal oxide of Formula 1 by reacting a nickel raw material, a cobalt raw material, a M1 raw material, a M3 raw material, and a lithium raw material (where, M1 includes at least one selected from the group consisting of aluminum (Al) and manganese (Mn), and M3 includes at least one element selected from the group consisting of tungsten (W), molybdenum (Mo), and chromium (Cr)); and performing a surface treatment on the core using a composition including a lithium oxide, or performing a heat treatment after mixing the core with a precursor of the lithium oxide, wherein the lithium oxide is oxide comprising lithium; and at least one metal selected from the group consisting of boron (B), W, hafnium (Hf), niobium (Nb), tantalum (Ta), Mo, silicon (Si), tin (Sn), and zirconium (Zr).

According to another aspect of the present invention, there is provided a positive electrode for a secondary battery, a lithium secondary battery, a battery module, and a battery pack which include the above-described positive electrode active material.

Details of other embodiments of the present invention are included in the following detailed description.

Advantageous Effects

A positive electrode active material for a secondary battery according to the present invention may exhibit excellent capacity and life characteristics when used in the battery by the formation of a surface treatment layer.

MODE FOR CARRYING OUT THE INVENTION

Hereinafter, the present invention will be described in more detail to allow for a clearer understanding of the present invention.

It will be understood that words or terms used in the specification and claims shall not be interpreted as the meaning defined in commonly used dictionaries. It will be further understood that the words or terms should be interpreted as having a meaning that is consistent with their meaning in the context of the relevant art and the technical idea of the invention, based on the principle that an inventor may properly define the meaning of the words or terms to best explain the invention.

A positive electrode active material for a secondary battery according to an embodiment of the present invention includes: a core; and a surface treatment layer disposed on a surface of the core, wherein the core is a secondary particle including a plurality of primary particles, the primary particles include a polycrystalline lithium composite metal oxide of the following Formula 1 having an average grain diameter of 50 nm to 200 nm, and the surface treatment layer includes a lithium oxide including lithium; and at least one metal selected from the group consisting of boron (B), tungsten (W), hafnium (Hf), niobium (Nb), tantalum (Ta), molybdenum (Mo), silicon (Si), tin (Sn), and zirconium (Zr).

$$Li_aNi_{1-x-y}Co_xM1_yM3_zM2_wO_2 \quad \text{[Formula 1]}$$

(in Formula 1, M1 includes at least one selected from the group consisting of aluminum (Al) and manganese (Mn), M2 includes at least one element selected from the group consisting of Zr, titanium (Ti), magnesium (Mg), Ta, and Nb, and M3 includes at least one element selected from the group consisting of W, Mo, and chromium (Cr), wherein 1.0≤a≤1.5, 0<x≤0.5, 0<y≤0.5, 0.002≤z≤0.03, 0≤w≤0.02, and 0<x+y≤0.7.)

The composition of the lithium composite metal oxide of Formula 1 is an average composition of the entire core.

Thus, since the positive electrode active material for a secondary battery may include the surface treatment layer including the above-described lithium oxide on the surface of the core, tap density of the positive electrode active material may be increased, and, as a result, rolling density may be increased. Also, since a direct contact between the core and an electrolyte solution is prevented, dissolution of the positive electrode active material in the electrolyte solution by a reaction with hydrofluoric acid derived from the electrolyte solution is prevented, and thus, cycle characteristics may be improved when used in the battery.

Specifically, the lithium oxide included in the surface treatment layer may include a compound of Formula 2 below.

$$Li_mMe_nO_{(m+By)/2} \quad \text{[Formula 2]}$$

in Formula 2,

Me includes at least one element selected from the group consisting of B, W, Hf, Nb, Ta, Mo, Si, Sn, and Zr, and, for example, may be B, W, Si, or Sn, wherein 1≤m≤10, 1≤n≤10, and B is an oxidation number of the Me.

The lithium oxide of Formula 2 is an average composition of the entire surface treatment layer.

For example, in a case in which the Me in Formula 2 is B, the lithium oxide may be $LiBO_2$ or $Li_2B_4O_7$, and may include any one thereof or a mixture of two or more thereof.

Also, in a case in which the Me in Formula 2 is W, the lithium oxide may be $Li_2WO_4$, $Li_4WO_5$, or $Li_6WO_6$, and may include any one thereof or a mixture of two or more thereof.

The Me included in the lithium oxide of Formula 2 may be included in an amount of 100 ppm to 20,000 ppm based on a total weight of the positive electrode active material. When the amount of the Me is less than 100 ppm, an improvement effect due to the formation of the surface treatment layer including the lithium oxide is insignificant, and, when the amount of the Me is greater than 20,000 ppm, battery characteristics may be degraded due to the excessive amount of the Me.

The surface treatment layer as described above may be formed on the entire surface of the core and may be partially formed. Specifically, in a case in which the surface treatment layer is partially formed, the surface treatment layer may be formed on 25% or more to less than 100% of a total surface area of the core. In a case in which the surface treatment layer forming area is less than 25%, the improvement effect due to the formation of the surface treatment layer is insignificant.

Also, in the case that the surface treatment layer is partially formed, the surface treatment layer locally formed on the surface of the core may be present in plurality.

Also, the surface treatment layer may be formed to an appropriate thickness in consideration of a particle diameter of the core which determines capacity of the active material. Specifically, the surface treatment layer may be formed at an average thickness ratio of 0.01 to 0.1 based on a radius of the core. When the thickness ratio of the surface treatment layer satisfies the above range, better capacity characteristics and life characteristics may be obtained. In the present invention, the particle diameter of the core and the thickness of the surface treatment layer may be measured by cross-sectional analysis of the particle using a focused ion beam (FIB).

In the positive electrode active material, the core includes the polycrystalline lithium composite metal oxide of Formula 1 in the form of a secondary particle in which two or more primary particles are agglomerated.

In the present invention, the expression "polycrystal" denotes a crystalline body which is composed of two or more crystal grains. Also, in the present invention, the crystal grains constituting the polycrystalline body denote primary particles, and the polycrystalline body denotes a form of a secondary particle in which these primary particles are agglomerated.

Specifically, in Formula 1, M3, as an element corresponding to group 6 (group VIB) of the Periodic Table, plays a role in suppressing particle growth in a sintering process during the preparation of the active material particle. The M3 may be present in a position, at which a nickel (Ni), cobalt (Co), or M1 element should be present, by substituting a portion of the Ni, Co, or M1 in a crystal structure of the positive electrode active material, or may form a lithium oxide by reacting with lithium. Accordingly, the diameter of the grain may be controlled by controlling an amount and time of addition of the M3. Specifically, the M3 may be at least one element selected from the group consisting of W, Mo, and Cr, and, for example, may be at least one element of W and Cr. Among them, in a case in which the M3 is W, the positive electrode active material may be excellent in terms of output characteristics, and, in a case in which the M3 is Cr, the positive electrode active material may be better in terms of a structural stability improvement effect.

The M3 may be included in an amount corresponding to z in the lithium composite metal oxide of Formula 1, that is, $0.002 \leq z \leq 0.03$. In a case in which z is less than 0.002 or greater than 0.03, realization of an active material satisfying the above-described characteristics is not easy and, as a result, an output and life characteristics improvement effect may be insignificant. The M3, for example, may be included in an amount satisfying $0.005 \leq z \leq 0.01$, in consideration of realization of the particle structure due to the control of the amount of the M3 and the resulting significant battery characteristics improvement effect.

Also, in the lithium composite metal oxide of Formula 1, lithium (Li) may be included in an amount corresponding to a, that is, $1.0 \leq a \leq 1.5$. When a is less than 1.0, there is a concern that capacity may be reduced, and, when a is greater than 1.5, since the particles are sintered in the sintering process, the preparation of the active material may be difficult. The Li, for example, may be included in an amount satisfying $1.0 \leq a \leq 1.15$, in consideration of balance between a significant capacity characteristics improvement effect of the positive electrode active material due to the control of the amount of the Li and sinterability during the preparation of the active material.

Furthermore, in the lithium composite metal oxide of Formula 1, Ni may be included in an amount corresponding to 1−x−y, i.e., 1 minus a sum of amount x corresponding to Co and amount y corresponding to M1, and may be included in an amount satisfying $0.3 \leq 1-x-y \leq 1$, for example, $0.35 \leq 1-x-y \leq 0.8$. When the amount of the Ni satisfies the above range, better capacity characteristics and high-temperature stability may be achieved.

Also, in the lithium composite metal oxide of Formula 1, cobalt (Co) may be included in an amount corresponding to x, that is, $0 < x \leq 0.5$. In a case in which x is 0, capacity characteristics may be reduced, and, in a case in which x is greater than 0.5, costs may be increased. The Co, for example, may be included in an amount satisfying $0.10 \leq x \leq 0.35$, in consideration of the significant capacity characteristics improvement effect due to the inclusion of the Co.

Furthermore, in the lithium composite metal oxide of Formula 1, M1 may be at least one selected from the group consisting of Al and Mn. In a case in which the M1 is Al, the M1 allows an average oxidation number of the active material to be maintained so that the life characteristics of the battery may be improved. Also, in a case in which the M1 is Mn, the M1 improves structural stability of the active material, and, as a result, stability of the battery may be improved.

The M1 may be included in an amount corresponding to y, that is, $0 < y \leq 0.5$. In a case in which y is 0, an improvement effect due to the inclusion of the M1 may not be obtained, and, in a case in which y is greater than 0.5, output characteristics and capacity characteristics of the battery may be degraded. The M1, for example, may be included in an amount satisfying $0.1 < y \leq 0.3$, in consideration of a significant battery characteristics improvement effect due to the inclusion of the M1 element.

Also, the Ni, Co, and M1 elements in the lithium composite metal oxide or the lithium composite metal oxide of Formula 1 may be partially substituted or doped with another element, that is, M2, to improve the battery characteristics by controlling the distribution of the metallic elements in the active material. The M2 may specifically be at least one element selected from the group consisting of Zr, Ti, Mg, Ta, and Nb, and, for example, may be Ti or Mg.

The M2 element may be included in an amount corresponding to w, that is, $0 \leq w \leq 0.02$, within a range in which characteristics of the positive electrode active material are not degraded.

Furthermore, in the core, at least one metallic element of the nickel, the M1, and the cobalt included in the lithium composite metal oxide of Formula 1 may have an increasing or decreasing concentration gradient in the core.

In the present invention, the expression "concentration gradient or concentration profile of the metallic element" denotes a graph showing a content of the metallic element according to a depth of the center from a surface of the particle when the X axis represents the depth of the center from the surface of the particle and the Y axis represents the content of the metallic element. For example, that an average slope of the concentration profile is positive denotes that a relatively greater amount of the corresponding metallic element is disposed in a particle center portion than in a particle surface portion, and, that the average slope is negative denotes that a relatively greater amount of the metallic element is disposed in the particle surface portion than in the particle center portion. In the present invention, the concentration gradient and concentration profile of the metal in the core may be identified by using a method such as X-ray photoelectron spectroscopy (XPS, also known as electron spectroscopy for chemical analysis (ESCA)), electron probe microanalysis (EPMA), inductively coupled plasma-atomic emission spectroscopy (ICP-AES), or time of flight secondary ion mass spectrometry (ToF-SIMS). Specifically, in a case in which the profile of the metallic element in the core is identified by XPS, an atomic ratio of each metal is measured for each etching time while etching the active material from the surface of the particle in a center direction, and the concentration profile of the metallic element may be identified therefrom.

Specifically, the at least one metallic element of the nickel, the cobalt, and the M1 may have a concentration gradient in which the concentration of the metal is gradually changed across the entire core particle, and a concentration gradient slope of the metallic element in the active material particle may have one or more values. Since the metallic element has a gradual concentration gradient, an abrupt phase boundary region is not present from the center to the surface, and thus, its crystal structure is stabilized and thermal stability is increased. Also, in a case in which the concentration gradient slope of the metal is constant, the effect of improvement in the structural stability may be further improved. Furthermore, since the concentration of each metal in the active material particle is changed by the concentration gradient, the effect of the positive electrode active material on the improvement of the battery performance may be further improved by easily using properties of the corresponding metal.

In the present invention, the expression "the concentration of the metal has a gradually changing gradient" denotes that the metal has a concentration distribution in which the concentration of the metal is gradually or continuously changed over the entire particle without having a rapid concentration change, i.e., a sharp concentration difference. Specifically, in the concentration distribution, the metal concentration per 1 µm, for example, 0.1 µm in the particle may have a difference of 0.1 at % to 30 at %, particularly 0.1 at % to 20 at %, and more particularly 1 at % to 10 at % based on a total atomic weight of the corresponding metal included in a precursor.

Specifically, the concentration of the nickel included in the core may be decreased while the nickel has a gradual concentration gradient from the center of the core particle in a surface direction of the particle. In this case, a concentration gradient slope of the nickel may be constant from the center of the core particle to the surface thereof. In a case in which the nickel has a concentration gradient in which a high concentration of the nickel is maintained at the core center and the concentration is decreased from the center of the core to the surface thereof, thermal stability of the positive electrode active material may be improved.

Also, the concentration of the M1 included in the core may be increased while the M1 has a gradual concentration gradient from the center of the core particle in the surface direction of the particle. In this case, a concentration gradient slope of the M1 may be constant from the center of the core particle to the surface thereof. In a case in which the M1 has a concentration gradient in which a low concentration of the M1, particularly manganese, is maintained at the center of the core particle and the concentration is increased from the center of the core to the surface thereof, the thermal stability may be improved without a decrease in capacity of the positive electrode active material. Specifically, the M1 may be Mn.

Furthermore, the concentration of the cobalt included in the core may be increased while the cobalt has a gradual concentration gradient from the center of the core particle in the surface direction of the particle. In this case, a concentration gradient slope of the cobalt may be constant from the center of the core particle to the surface thereof. In a case in which the cobalt has a concentration gradient in which a low concentration of the cobalt is maintained at the core center and the concentration is increased from the center of the core to the surface thereof, capacity characteristics of the positive electrode active material may be improved while reducing the amount of the cobalt used.

Also, the nickel, the M1, and the cobalt each independently may have a concentration gradient that changes across the entire core particle, the concentration of the nickel may be decreased while the nickel has a gradual concentration gradient from the center of the core in the surface direction, and the concentrations of the cobalt and the M1 may be increased while the cobalt and the M1 each independently have a gradual concentration gradient from the center of the core in the surface direction. Thus, since the positive electrode active material according to the embodiment of the present invention has a combined concentration gradient, in which the concentration of the nickel is decreased and the concentrations of the M1 and cobalt are increased from the center to the surface of the core, across the entire core, the thermal stability may be improved while maintaining the capacity characteristics of the positive electrode active material.

Furthermore, in the positive electrode active material according to the embodiment of the present invention, the inside of the core may be doped with the Me element of the lithium oxide of Formula 2. In this case, the Me element may have a concentration gradient in which the concentration of the Me element is gradually decreased from the surface of the core to the inside thereof.

As described above, in a case in which the lithium composite metal oxide in the core is doped with the Me, the output characteristic may be further improved by controlling the distribution of the metallic element in the lithium composite metal oxide, and, since the Me has the concentration gradient, the structural stability and the resulting life characteristics of the active material may be increased by reducing the concentration difference with respect to the concentration of the Me included in the surface treatment layer.

Also, in the positive electrode active material according to the embodiment of the present invention, the core, as the secondary particle in which the primary particles are assembled, may exhibit excellent output characteristics. Furthermore, the core has an optimized grain diameter so as to exhibit high output characteristics by controlling the amount of the M3 element included in the lithium composite metal oxide and sintering conditions during the preparation thereof.

Specifically, an average grain diameter of the primary particles constituting the polycrystalline lithium composite metal oxide may be in a range of 50 nm to 200 nm, and, in consideration of the significant output characteristics improvement effect due to the control of the grain diameter, the average grain diameter of the primary particles, for example, may be in a range of 80 nm to 120 nm.

In the present invention, the average grain diameter may be quantitatively analyzed by using X-ray diffraction analysis of the lithium composite metal oxide particles. For example, the average grain diameter of the primary particles may be quantitatively analyzed by putting the polycrystalline lithium composite metal oxide particles in a holder and analyzing diffraction patterns obtained by irradiation of the particles with X-rays.

Furthermore, the secondary particulate core, in which the above-described primary particles are assembled, may have an average particle diameter ($D_{50}$) of 2 µm to 20 µm.

If the average particle diameter of the secondary particle is less than 2 µm, there is a concern that stability of the polycrystalline lithium composite metal oxide particles may be reduced, and, if the average particle diameter of the secondary particle is greater than 20 µm, there is a concern that the output characteristics of the secondary battery may be reduced. Also, since the positive electrode active material according to the present invention satisfies the average particle diameter of the secondary particle and the above-described grain diameter of the primary particle at the same time, the positive electrode active material according to the present invention may have more improved output characteristics as well as excellent structural stability when used in the battery. Furthermore, in consideration of a significant improvement effect due to the simultaneous control of the grain diameter of the primary particle and the average particle diameter of the secondary particle, the average grain diameter of the primary particles may be in a range of 80 nm to 120 nm, and the average particle diameter of the secondary particle may be in a range of 3 μm to 15 μm.

In the present invention, the average particle diameter ($D_{50}$) of the core may be defined as a particle diameter at 50% in a cumulative particle diameter distribution. In the present invention, the average particle diameter ($D_{50}$) of the core particle, for example, may be measured by electron microscopy using a scanning electron microscope (SEM) or field emission scanning electron microscope (FE-SEM), or using a laser diffraction method. Specifically, when measured by the laser diffraction method, the core particles are dispersed in a dispersion medium, the dispersion medium is introduced into a commercial laser diffraction particle size measurement instrument (e.g., Microtrac MT 3000) and irradiated with ultrasonic waves having a frequency of about 28 kHz and an output of 60 W, and the average particle diameter ($D_{50}$) at 50% in a cumulative particle diameter distribution of the measurement instrument may then be calculated.

The positive electrode active material according to the embodiment of the present invention having the above-described structure and configuration may have an average particle diameter ($D_{50}$) of 2 μm to 20 μm and a Brunauer-Emmett-Teller (BET) specific surface area of 0.5 $m^2$/g to 1.9 $m^2$/g.

In a case in which the average particle diameter ($D_{50}$) of the positive electrode active material is less than 2 μm or the BET specific surface area is greater than 1.9 $m^2$/g, dispersion of the positive electrode active material in the active material layer may be reduced and resistance in the electrode may be increased due to the agglomeration of the positive electrode active material, and, in a case in which the average particle diameter ($D_{50}$) is greater than 20 μm or the BET specific surface area is less than 0.5 $m^2$/g, dispersion of the positive electrode active material itself may be reduced and the capacity may be reduced. Also, since the positive electrode active material according to the embodiment of the present invention satisfies the above-described average particle diameter and BET specific surface area conditions at the same time, excellent capacity and charge and discharge characteristics may be obtained. For example, the positive electrode active material may have an average particle diameter ($D_{50}$) of 3 μm to 15 μm and a BET specific surface area of 1.0 $m^2$/g to 1.5 $m^2$/g.

In the present invention, the average particle diameter ($D_{50}$) of the positive electrode active material may be defined and measured in the same manner as in the measurement of the average particle diameter of the core. Also, in the present invention, the specific surface area of the positive electrode active material is measured by a BET method, wherein, specifically, the specific surface area may be calculated from a nitrogen gas adsorption amount at a liquid nitrogen temperature (77K) using BELSORP-mini II by
Bell Japan Inc.

Also, the positive electrode active material according to the embodiment of the present invention may have a tap density of 1.7 g/cc or more, or 1.7 g/cc to 2.5 g/cc. The positive electrode active material of the present invention may exhibit high capacity characteristics by having high tap density within the above-described range. In the present invention, the tap density of the positive electrode active material may be measured by using a typical tap density meter, and may be specifically measured by using a powder tester manufactured by Seishin Enterprise Co., Ltd.

Furthermore, the positive electrode active material according to the embodiment of the present invention may be prepared by a preparation method including the steps of: preparing a core including a polycrystalline lithium composite metal oxide of Formula 1 by reacting a nickel raw material, a cobalt raw material, a M1 raw material, a M3 raw material, and a lithium raw material (where, M1 includes at least one selected from the group consisting of Al and Mn, and M3 includes at least one element selected from the group consisting of W, Mo, and Cr) (step 1); and performing a surface treatment on the core using a composition including a lithium oxide, or performing a heat treatment after mixing the core with a precursor of the lithium oxide (step 2). In a case in which the positive electrode active material further includes M2 (where, M2 includes at least one element selected from the group consisting of Zr, Ti, Mg, Ta, and Nb), a M2 raw material may also be added during the mixing of the raw materials of each metallic element in step 1. Thus, according to another embodiment of the present invention, provided is a method of preparing the above-described positive electrode active material.

Hereinafter, each step will be described in detail, and, in the method of preparing the positive electrode active material, step 1 is a step of preparing a core using a nickel raw material, a cobalt raw material, a M1 raw material, a M3 raw material, and selectively a M2 raw material.

Specifically, depending on the time of addition of the M3 raw material, the core may be prepared by a method (method 1) in which, after preparing a composite metal hydroxide by reacting the nickel raw material, the cobalt raw material, and the M1 raw material (where, M1 includes at least one element selected from the group consisting of Al and Mn), the composite metal hydroxide is mixed with the lithium raw material and the M3 raw material and sintered, or a method (method 2) in which, after preparing a composite metal hydroxide by reacting the nickel raw material, the cobalt raw material, the M1 raw material, and the M3 raw material, the composite metal hydroxide is mixed with the lithium raw material and sintered.

First, with respect to method 1, after preparing a composite metal hydroxide or oxyhydroxide, as a precursor, by adding an ammonium cation-containing complexing agent and a basic compound to a metal-containing solution, which is prepared by mixing the nickel raw material, the cobalt raw material, the M1 raw material, and the M3 raw material, and performing a reaction, and subsequently mixing the precursor with the lithium raw material, method 1 may be performed by performing primary sintering at 500° C. to 700° C. and secondary sintering at 700° C. to 900° C. In a case in which the positive electrode active material further includes M2 (where, M2 includes at least one element selected from the group consisting of Zr, Ti, Mg, Ta, and Nb), the M2 raw material may also be added during the mixing of the raw materials of each metallic element, or the M2 raw material may also be added during the mixing with the lithium raw material in the subsequent step.

Also, with respect to method 2, after preparing a composite metal hydroxide or oxyhydroxide, as a precursor, by adding an ammonium cation-containing complexing agent and a basic compound to a metal-containing solution, which is prepared by mixing the nickel raw material, the cobalt raw material, and the M1 raw material, and performing a reaction, and subsequently mixing the precursor with the lithium raw material and the M3 raw material, method 2 may be performed by performing primary sintering at 500° C. to 700° C. and secondary sintering at 700° C. to 900° C.

In methods 1 and 2, a mixing ratio of each raw material may be appropriately determined within a range that satisfies a condition of amount of each metallic element in the finally prepared positive electrode active material.

The metal-containing solution may be prepared by respectively adding the nickel raw material, the cobalt raw material, the M1 raw material, the M3 raw material, and selectively M2 raw material to a solvent, particularly water, or a mixture of water and an organic solvent (specifically, alcohol etc.) which may be uniformly mixed with the water, or may be prepared by preparing solutions, particularly aqueous solutions, including each of the metal raw materials and then mixing these solutions.

An acetic acid salt, nitrate, sulfate, halide, sulfide, hydroxide, oxide, or oxyhydroxide may be used as the above-described raw materials including metallic elements, and the raw materials including metallic elements are not particularly limited as long as the raw materials may be dissolved in water.

For example, the cobalt raw material may include $Co(OH)_2$, $CoOOH$, $CoSO_4$, $Co(OCOCH_3)_2 \cdot 4H_2O$, $Co(NO_3)_2 \cdot 6H_2O$, or $Co(SO_4)_2 \cdot 7H_2O$, and any one thereof or a mixture of two or more thereof may be used.

Also, the nickel raw material may include $Ni(OH)_2$, $NiO$, $NiOOH$, $NiCO_3 \cdot 2Ni(OH)_2 \cdot 4H_2O$, $NiC_2O_2 \cdot 2H_2O$, $Ni(NO_3)_2 \cdot 6H_2O$, $NiSO_4$, $NiSO_4 \cdot 6H_2O$, a fatty acid nickel salt, or a nickel halide, and any one thereof or a mixture of two or more thereof may be used.

Furthermore, the manganese raw material may include a manganese oxide such as $Mn_2O_3$, $MnO_2$, and $Mn_3O_4$; a manganese salt such as $MnCO_3$, $Mn(NO_3)_2$, $MnSO_4$, manganese acetate, manganese dicarboxylate, manganese citrate, and a fatty acid manganese salt; an oxyhydroxide, and manganese chloride, and any one thereof or a mixture of two or more thereof may be used.

Also, the aluminum raw material may include $AlSO_4$, $AlCl$, or $AlNO_3$, and any one thereof or a mixture of two or more thereof may be used.

Furthermore, as the M3 raw material, an acetic acid salt, nitrate, sulfate, halide, sulfide, hydroxide, oxide, or oxyhydroxide containing the M3 element may be used. For example, in a case in which the M3 is W, tungsten oxide and tungstic acid ($H_2WO_4$) may be used.

Also, the ammonium cation-containing complexing agent may specifically include $NH_4OH$, $(NH_4)_2SO_4$, $NH_4NO_3$, $NH_4Cl$, $CH_3COONH_4$, or $NH_4CO_3$, and any one thereof or a mixture of two or more thereof may be used. Also, the ammonium cation-containing complexing agent may be used in the form of an aqueous solution, and, in this case, water or a mixture of water and an organic solvent (specifically, alcohol etc.), which may be uniformly mixed with the water, may be used as a solvent.

The ammonium cation-containing complexing agent may be added in an amount such that a molar ratio of the ammonium cation-containing complexing agent to 1 mole of the metal-containing solution becomes 0.5 to 1. In general, a chelating agent reacts with metal at a molar ratio equal to or greater than 1:1 to form a complex, but, since an unreacted complex, which does not react with a basic aqueous solution, among the formed complex may be changed into an intermediate product to be recovered and reused as the chelating agent, the amount of the chelating agent used may be reduced in the present invention, in comparison to a conventional case. As a result, crystallinity of the positive electrode active material may be increased and stabilized.

Furthermore, the basic compound may include a hydroxide of alkali metal or alkaline earth metal, such as NaOH, KOH, or $Ca(OH)_2$, or a hydrate thereof, and any one thereof or a mixture of two or more thereof may be used. The basic compound may also be used in the form of an aqueous solution, and, in this case, water or a mixture of water and an organic solvent (specifically, alcohol etc.), which may be uniformly mixed with the water, may be used as a solvent.

Also, the co-precipitation reaction for the formation of the precursor may be performed in a pH range of 11 to 13. In a case in which the pH is outside the above range, there is a concern that a diameter of the prepared precursor may be changed or particle breakage may occur. Furthermore, since metal ions are eluted on the surface of the precursor, there is a concern that various oxides may be formed by a side reaction. Specifically, the co-precipitation reaction may be performed under a condition in which the pH is in a range of 11 to 12.

In order to satisfy the above-described pH range, the ammonium cation-containing complexing agent and the basic compound may be used in a molar ratio of 1:10 to 1:2. In this case, the pH value denotes a pH value measured at a liquid temperature of 25° C.

Also, the co-precipitation reaction may be performed in a temperature range of 40° C. to 70° C. in an inert atmosphere such as nitrogen. Furthermore, a stirring process may be selectively performed to increase the reaction rate during the reaction, and, in this case, a stirring speed may be in a range of 100 rpm to 2,000 rpm.

Furthermore, in a case in which the concentration gradient of the metallic element is desired to be formed in the finally prepared positive electrode active material, step 1 may be performed by preparing a metal-containing solution (hereinafter, referred to as a "second metal-containing solution") including nickel, cobalt, M1-containing metal raw materials, and selectively M2 and M3-containing raw materials in a concentration different from that of the above-described metal-containing solution, then adding an ammonium cation-containing complexing agent and a basic compound as well as the second metal-containing solution to the metal-containing solution to allow a mixing ratio of the metal-containing solution to the second metal-containing solution to be gradually changed from 100 vol %:0 vol % to 0 vol %:100 vol %, and performing a reaction.

Since reaction rate and reaction time are controlled while gradually increasing an amount of the second metal-containing solution added to the metal-containing solution, a precursor, which has a concentration gradient in which the nickel, the cobalt, and the M1 each independently are gradually changed from the center of the particle to the surface thereof, may be prepared by a single co-precipitation reaction process. The concentration gradient of the metal in the precursor prepared in this case and its slope may be easily adjusted by compositions and a mixed feed ratio of the metal-containing solution and the second metal-containing solution. In order to produce a high density state in which the concentration of the specific metal is high, it is describable to increase the reaction time and decrease the reaction rate, and, in order to produce a low density state in which the concentration of the specific metal is low, it is describable to decrease the reaction time and increase the reaction rate.

Specifically, a rate of the second metal-containing solution added to the metal-containing solution may be gradually increased within a range of 1% to 30% of an initial feed rate. Specifically, a feed rate of the metal-containing solution may be in a range of 150 ml/hr to 210 ml/hr, the feed rate of the second metal-containing solution may be in a range of 120 ml/hr to 180 ml/hr, and the feed rate of the second metal-containing solution may be gradually increased within a range of 1% to 30% of the initial feed rate and within the above feed rate range. In this case, the reaction may be performed in a temperature range of 40° C. to 70° C. Also, the diameter of the precursor particle may be controlled by adjusting the amount of the second metal-containing solution added to the first metal-containing solution and the reaction time.

Particles of composite metal hydroxide or oxyhydroxide, as the precursor, are formed and precipitated in the reaction solution by the above-described process. Specifically, the precursor may include a compound of the following Formula 3.

$$Ni_{1-x-y}Co_xM1_yM3_zM2_wA \qquad \text{[Formula 3]}$$

(in Formula 3, A is a hydroxy group or oxyhydroxy group, and M1, M2, M3, x, y, z, and w are the same as previously defined)

Also, the precipitated precursor is separated according to a conventional method, and a drying process may then be selectively performed.

The drying process may be performed by a typical drying method, and may be specifically performed for 15 hours to 30 hours by a method such as heating in a temperature range of 100° C. to 200° C. or hot air injection.

Next, a lithium-containing raw material and selectively a M3 raw material are mixed with the precursor prepared by the co-precipitation reaction, and a sintering process is performed. In this case, the M3 raw material is the same as that previously described.

Also, the lithium-containing raw material may include a lithium-containing carbonate (e.g., lithium carbonate etc.), hydrate (e.g., lithium hydroxide monohydrate ($LiOH \cdot H_2O$) etc.), hydroxide (e.g., lithium hydroxide etc.), nitrate (e.g., lithium nitrate ($LiNO_3$) etc.), or chloride (e.g., lithium chloride (LiCl) etc.), and any one thereof or a mixture of two or more thereof may be used. Also, an amount of the lithium-containing raw material used may be determined according to amounts of the lithium and the transition metal in the finally prepared lithium composite metal oxide, and, specifically, the lithium-containing raw material may be used in an amount such that a molar ratio (molar ratio of lithium/metallic element (Me)) of the lithium included in the lithium raw material to the metallic element (Me) included in the precursor is 1.0 or more.

Also, the sintering process may be performed in multiple stages including primary sintering at 250° C. to 500° C. and secondary sintering at 700° C. to 900° C.

The primary sintering is for increasing sintering rate during the secondary sintering, and physical properties including the above-described grain diameter may be achieved by subsequently performing the secondary sintering at a temperature higher than that of the primary sintering. Specifically, the sintering process may be performed in two stages including primary sintering at 400° C. to 500° C. and secondary sintering at 750° C. to 850° C.

Furthermore, the sintering process may be performed in an air atmosphere or oxygen atmosphere (e.g., $O_2$ etc.), and, for example, may be performed in an oxygen atmosphere at an oxygen partial pressure of 20 vol % or more. Also, the sintering process may be performed under the above-described condition for 5 hours to 48 hours, or 10 hours to 20 hours.

Furthermore, a sintering aid may be further selectively added during the sintering process.

When the sintering aid is added, crystals may be easily grown at low temperature and a non-uniform reaction during dry mixing may be minimized.

Specifically, the sintering aid may include a boron compound such as boric acid, lithium tetraborate, boron oxide, and ammonium borate; a cobalt compound such as cobalt oxide (II), cobalt oxide (III), cobalt oxide (IV), and tricobalt tetraoxide; a vanadium compound such as vanadium oxide; a lanthanum compound such as lanthanum oxide; a zirconium compound such as zirconium boride, calcium zirconium silicate, and zirconium oxide; an yttrium compound such as yttrium oxide; or a gallium compound such as gallium oxide, and any one thereof or a mixture of two or more thereof may be used.

The sintering aid may be used in an amount of 0.2 part by weight to 2 parts by weight, for example, 0.4 part by weight to 1.4 parts by weight based on 100 parts by weight of the precursor.

Also, a water-removing agent may be further selectively added during the sintering process. Specifically, the water-removing agent may include citric acid, tartaric acid, glycolic acid, or maleic acid, and any one thereof or a mixture of two or more thereof may be used. The water-removing agent may be used in an amount of 0.01 part by weight to 2 parts by weight based on 100 parts by weight of the precursor.

A core particle having the above-described characteristics is prepared by the process of step 1.

Next, step 2 in the method of preparing the positive electrode active material is a step of preparing a positive electrode active material by forming a surface treatment layer on the core prepared in step 1.

Specifically, the surface treatment layer may be formed by performing a surface treatment on the core prepared in step 1 using a composition including the lithium oxide, or performing a heat treatment after mixing the core with a precursor of the lithium oxide.

First, in a case in which the surface treatment is performed by using the composition including the lithium oxide, the surface treatment may be performed on the core with the composition, which is prepared by dispersing the above-described lithium oxide in a solvent, using a conventional slurry coating method, such as coating, dipping, and spraying, and a heat treatment may then be performed.

Also, the solvent, which may be used in the preparation of the composition, may include water, an alcohol having 1 to 8 carbon atoms (e.g., methanol, ethanol, or isopropyl alcohol), or a polar organic solvent, such as dimethyl sulfoxide (DMSO), N-methylpyrrolidone (NMP), and acetone, and any one thereof or a mixture of two or more thereof may be used. Furthermore, the above-described solvent may be included in an amount such that the composition may have appropriate coating properties during the surface treatment and may be easily removed during the subsequent heat treatment.

The heat treatment after the surface treatment may be performed in a temperature range in which the solvent used in the composition may be removed. Specifically, the heat treatment may be performed in a temperature range of 100° C. to 250° C. In a case in which the temperature during the heat treatment is less than 100° C., a side reaction may occur due to the residual solvent component and battery characteristics may be degraded due to the side reaction. In a case in which the temperature during the heat treatment is greater than 250° C., a side reaction may occur due to high heat.

As another method, in a case in which the core is mixed with the precursor of the lithium oxide and is then heat treated, an acetic acid salt, nitrate, sulfate, halide, sulfide, hydroxide, oxide, or oxyhydroxide including a metal (Me), specifically, at least one element selected from the group consisting of B, W, Hf, Nb, Ta, Mo, Sn, and Zr may be used as the precursor of the lithium oxide. For example, in a case in which the Me is B, the precursor may include boric acid, lithium tetraborate, boron oxide, and ammonium borate, and any one thereof or a mixture of two or more thereof may be used. Also, in a case in which the Me is tungsten, the precursor may include tungsten oxide (VI).

The heat treatment after the mixing of the core and the precursor of the lithium oxide may be performed in a temperature range of 500° C. to 1,200° C.

If the heat treatment temperature is less than 500° C., the formation of the lithium oxide of Formula 2 is not facilitated, and, if the heat treatment temperature is greater than 1,200° C., a side reaction product may be generated due to over-sintering.

Also, an atmosphere during the heat treatment is not particularly limited, but the heat treatment may be performed in a vacuum, inert, or air atmosphere.

The positive electrode active material prepared by the above-described processes may exhibit excellent capacity and life characteristics when used in the battery due to the formation of the surface treatment layer, and may exhibit better output characteristics by the control of the grain diameter of the primary particles constituting the core. Also, in a case in which the distribution of the transition metals in the positive electrode active material is additionally controlled, thermal stability is improved, and thus, performance degradation at a high voltage may be minimized.

Thus, according to another embodiment of the present invention, provided are a positive electrode and a lithium secondary battery which include the above-described positive electrode active material.

Specifically, the positive electrode includes a positive electrode collector and a positive electrode active material layer formed on the positive electrode collector and including the above-described positive electrode active material.

The positive electrode collector is not particularly limited as long as it has conductivity without causing adverse chemical changes in the battery, and, for example, stainless steel, aluminum, nickel, titanium, fired carbon, or aluminum or stainless steel that is surface-treated with one of carbon, nickel, titanium, silver, or the like may be used. Also, the positive electrode collector may typically have a thickness of 3 µm to 500 µm, and microscopic irregularities may be formed on the surface of the collector to improve the adhesion of the positive electrode active material. The positive electrode collector, for example, may be used in various shapes such as that of a film, a sheet, a foil, a net, a porous body, a foam body, a non-woven fabric body, and the like.

Also, the positive electrode active material layer may include a conductive agent and a binder in addition to the above-described positive electrode active material.

In this case, the conductive agent is used to provide conductivity to the electrode, wherein any conductive agent may be used without particular limitation as long as it has suitable electron conductivity without causing adverse chemical changes in the battery. Specific examples of the conductive agent may be graphite such as natural graphite or artificial graphite; carbon based materials such as carbon black, acetylene black, Ketjen black, channel black, furnace black, lamp black, thermal black, and carbon fibers; powder or fibers of metal such as copper, nickel, aluminum, and silver; conductive whiskers such as zinc oxide whiskers and potassium titanate whiskers; conductive metal oxides such as titanium oxide; or conductive polymers such as polyphenylene derivatives, and any one thereof or a mixture of two or more thereof may be used. The conductive agent may be typically included in an amount of 1 wt % to 30 wt % based on a total weight of the positive electrode active material layer.

Furthermore, the binder improves the adhesion between the positive electrode active material particles and the adhesion between the positive electrode active material and the current collector. Specific examples of the binder may be polyvinylidene fluoride (PVDF), polyvinylidene fluoride-hexafluoropropylene copolymer (PVDF-co-HFP), polyvinyl alcohol, polyacrylonitrile, carboxymethyl cellulose (CMC), starch, hydroxypropyl cellulose, regenerated cellulose, polyvinylpyrrolidone, tetrafluoroethylene, polyethylene, polypropylene, an ethylene-propylene-diene monomer (EPDM), a sulfonated EPDM, a styrene-butadiene rubber (SBR), a fluorine rubber, or various copolymers thereof, and any one thereof or a mixture of two or more thereof may be used. The binder may be included in an amount of 1 wt % to 30 wt % based on the total weight of the positive electrode active material layer.

The positive electrode may be prepared according to a typical method of preparing a positive electrode except that the above-described positive electrode active material is used. Specifically, a composition for forming a positive electrode active material layer, which includes the positive electrode active material as well as selectively the binder and the conductive agent, is coated on the positive electrode collector, and the positive electrode may then be prepared by drying and rolling the coated positive electrode collector. In this case, types and amounts of the positive electrode active material, the binder, and the conductive are the same as those previously described.

The solvent may be a solvent normally used in the art. The solvent may include dimethyl sulfoxide (DMSO), isopropyl alcohol, N-methylpyrrolidone (NMP), acetone, or water, and any one thereof or a mixture of two or more thereof may be used. An amount of the solvent used may be sufficient if the solvent may dissolve or disperse the positive electrode active material, the conductive agent, and the binder in consideration of a coating thickness of a slurry and manufacturing yield, and may allow to have a viscosity that may provide excellent thickness uniformity during the subsequent coating for the preparation of the positive electrode.

Also, as another method, the positive electrode may be prepared by casting the composition for forming a positive electrode active material layer on a separate support and then laminating a film separated from the support on the positive electrode collector.

According to another embodiment of the present invention, an electrochemical device including the positive electrode is provided. The electrochemical device may specifically be a battery or a capacitor, and, for example, may be a lithium secondary battery.

The lithium secondary battery specifically includes a positive electrode, a negative electrode disposed to face the positive electrode, a separator disposed between the positive electrode and the negative electrode, and an electrolyte, wherein the positive electrode is as described above. Also, the lithium secondary battery may further selectively include a battery container accommodating an electrode assembly of the positive electrode, the negative electrode, and the separator, and a sealing member sealing the battery container.

In the lithium secondary battery, the negative electrode includes a negative electrode collector and a negative electrode active material layer disposed on the negative electrode collector.

The negative electrode collector is not particularly limited as long as it has high conductivity without causing adverse chemical changes in the battery, and, for example, copper, stainless steel, aluminum, nickel, titanium, fired carbon, copper or stainless steel that is surface-treated with one of carbon, nickel, titanium, silver, or the like, and an aluminum-cadmium alloy may be used. Also, the negative electrode collector may typically have a thickness of 3 μm to 500 μm, and, similar to the positive electrode collector, microscopic irregularities may be formed on the surface of the collector to improve the adhesion of a negative electrode active material. The negative electrode collector, for example, may be used in various shapes such as that of a film, a sheet, a foil, a net, a porous body, a foam body, a non-woven fabric body, and the like.

The negative electrode active material layer selectively includes a binder and a conductive agent in addition to the negative electrode active material. The negative electrode active material layer may be prepared by coating a composition for forming a negative electrode, which selectively includes the binder and the conductive agent as well as the negative electrode active material, on the negative electrode collector and drying the coated negative electrode collector, or may be prepared by casting the composition for forming a negative electrode on a separate support and then laminating a film separated from the support on the negative electrode collector.

A compound capable of reversibly intercalating and deintercalating lithium may be used as the negative electrode active material. Specific examples of the negative electrode active material may be a carbonaceous material such as artificial graphite, natural graphite, graphitized carbon fibers, and amorphous carbon; a metal nitride compound alloyable with lithium such as silicon (Si), aluminum (Al), tin (Sn), lead (Pb), zinc (Zn), bismuth (Bi), indium (In), magnesium (Mg), gallium (Ga), cadmium (Cd), a Si alloy, a Sn alloy, or an Al alloy; a metal oxide which may be doped and undoped with lithium such as $SiO_x(0<x<2)$, $SnO_2$, vanadium oxide, and lithium vanadium oxide; or a composite including the metal nitride compound and the carbonaceous material such as a Si—C composite or a Sn—C composite, and any one thereof or a mixture of two or more thereof may be used. Also, a metallic lithium thin film may be used as the negative electrode active material. Furthermore, both low crystalline carbon and high crystalline carbon may be used as the carbon material. Typical examples of the low crystalline carbon may be soft carbon and hard carbon, and typical examples of the high crystalline carbon may be irregular, planar, flaky, spherical, or fibrous natural graphite or artificial graphite, Kish graphite, pyrolytic carbon, mesophase pitch-based carbon fibers, meso-carbon microbeads, mesophase pitches, and high-temperature sintered carbon such as petroleum or coal tar pitch derived cokes.

Also, the binder and the conductive agent may be the same as those previously described in the positive electrode.

In the lithium secondary battery, the separator separates the negative electrode and the positive electrode and provides a movement path of lithium ions, wherein any separator may be used as the separator without particular limitation as long as it is typically used in a lithium secondary battery, and particularly, a separator having high moisture-retention ability for an electrolyte as well as low resistance to the transfer of electrolyte ions may be used. Specifically, a porous polymer film, for example, a porous polymer film prepared from a polyolefin-based polymer, such as an ethylene homopolymer, a propylene homopolymer, an ethylene/butene copolymer, an ethylene/hexene copolymer, and an ethylene/methacrylate copolymer, or a laminated structure having two or more layers thereof may be used. Also, a typical porous nonwoven fabric, for example, a nonwoven fabric formed of high melting point glass fibers or polyethylene terephthalate fibers may be used. Furthermore, a coated separator including a ceramic component or a polymer material may be used to secure heat resistance or mechanical strength, and the separator having a single layer or multilayer structure may be selectively used.

Also, the electrolyte used in the present invention may include an organic liquid electrolyte, an inorganic liquid electrolyte, a solid polymer electrolyte, a gel-type polymer electrolyte, a solid inorganic electrolyte, or a molten-type inorganic electrolyte which may be used in the preparation of the lithium secondary battery, but the present invention is not limited thereto.

Specifically, the electrolyte may include an organic solvent and a lithium salt.

Any organic solvent may be used as the organic solvent without particular limitation so long as it may function as a medium through which ions involved in an electrochemical reaction of the battery may move. Specifically, an ester-based solvent such as methyl acetate, ethyl acetate, γ-butyrolactone, and ε-caprolactone; an ether-based solvent such as dibutyl ether or tetrahydrofuran; a ketone-based solvent such as cyclohexanone; an aromatic hydrocarbon-based solvent such as benzene and fluorobenzene; or a carbonate-based solvent such as dimethyl carbonate (DMC), diethyl carbonate (DEC), methylethyl carbonate (MEC), ethylmethyl carbonate (EMC), ethylene carbonate (EC), and propylene carbonate (PC); an alcohol-based solvent such as ethyl alcohol and isopropyl alcohol; nitriles such as R—CN (where R is a linear, branched, or cyclic C2-C20 hydrocarbon group and may include a double-bond aromatic ring or ether bond); amides such as dimethylformamide; dioxolanes such as 1,3-dioxolane; or sulfolanes may be used as the organic solvent. Among these solvents, the carbonate-based solvent may be used, and, for example, a mixture of a cyclic carbonate (e.g., ethylene carbonate or propylene carbonate) having high ionic conductivity and high dielectric constant, which may increase charge/discharge performance of the battery, and a low-viscosity linear carbonate-based compound (e.g., ethylmethyl carbonate, dimethyl carbonate, or diethyl carbonate) may be used. In this case, the performance of the electrolyte solution may be excellent when the cyclic carbonate and the chain carbonate are mixed in a volume ratio of about 1:1 to about 1:9.

The lithium salt may be used without particular limitation as long as it is a compound capable of providing lithium ions used in the lithium secondary battery. Specifically, $LiPF_6$, $LiClO_4$, $LiAsF_6$, $LiBF_4$, $LiSbF_6$, $LiAlO_4$, $LiAlCl_4$, $LiCF_3SO_3$, $LiC_4F_9SO_3$, $LiN(C_2F_5SO_3)_2$, $LiN(C_2F_5SO_2)_2$, $LiN(CF_3SO_2)_2$, $LiCl$, $LiI$, or $LiB(C_2O_4)_2$ may be used as the lithium salt. The lithium salt may be used in a concentration range of 0.1 M to 2.0 M. In a case in which the concentration of the lithium salt is included within the above range, since the electrolyte may have appropriate conductivity and viscosity, excellent performance of the electrolyte may be obtained and lithium ions may effectively move.

In order to improve lifetime characteristics of the battery, suppress the reduction in battery capacity, and improve discharge capacity of the battery, at least one additive, for example, a halo-alkylene carbonate-based compound such as difluoroethylene carbonate, pyridine, triethylphosphite, triethanolamine, cyclic ether, ethylenediamine, n-glyme, hexaphosphoric triamide, a nitrobenzene derivative, sulfur, a quinone imine dye, N-substituted oxazolidinone, N,N-substituted imidazolidine, ethylene glycol dialkyl ether, an ammonium salt, pyrrole, 2-methoxy ethanol, or aluminum trichloride, may be further added to the electrolyte in addition to the electrolyte components. In this case, the additive may be included in an amount of 0.1 wt % to 5 wt % based on a total weight of the electrolyte.

As described above, since the lithium secondary battery including the positive electrode active material according to the present invention stably exhibits excellent discharge capacity, output characteristics, and capacity retention, the lithium secondary battery is suitable for portable devices, such as mobile phones, notebook computers, and digital cameras, and electric cars such as hybrid electric vehicles (HEVs).

Thus, according to another embodiment of the present invention, a battery module including the lithium secondary battery as a unit cell and a battery pack including the battery module are provided.

The battery module or the battery pack may be used as a power source of at least one medium and large sized device of a power tool; electric cars including an electric vehicle (EV), a hybrid electric vehicle, and a plug-in hybrid electric vehicle (PHEV); or a power storage system.

Hereinafter, examples of the present invention will be described in detail in such a manner that it may easily be carried out by a person with ordinary skill in the art to which the present invention pertains. The invention may, however, be embodied in many different forms and should not be construed as being limited to the examples set forth herein.

Example 1-1: Preparation of Positive Electrode Active Material

In a 5 L batch-type reactor set at 60° C., nickel sulfate ($NiSO_4$), cobalt sulfate ($CoSO_4$), manganese sulfate ($MnSO_4$), and tungstic acid ($H_2WO_4$), as a tungsten-containing raw material, were mixed in water in a molar ratio of 0.6:0.2:0.2:0.005 to prepare a metal-containing solution with a concentration of 2M. A container containing the metal-containing solution was connected to the reactor, and a 4M NaOH solution and a 7% $NH_4OH$ aqueous solution were prepared and connected to the reactor, respectively. 3 L of deionized water was put in a co-precipitation reactor (capacity 5 L), the reactor was then purged with nitrogen gas at a rate of 2 L/min to remove dissolved oxygen in the water and create a non-oxidizing atmosphere in the reactor. Thereafter, 100 ml of 4M NaOH was added, and stirring was then performed at a speed of 1,200 rpm and a temperature of 60° C. to maintain a pH at 12.0. Subsequently, the metal-containing solution, the NaOH aqueous solution, and the $NH_4OH$ aqueous solution were respectively added at rates of 180 ml/hr, 180 ml/hr, and 10 ml/hr and reacted for 24 hours to form a nickel manganese cobalt-based composite metal hydroxide as a precursor. Nickel manganese cobalt-based composite metal hydroxide particles thus formed were mixed with a lithium hydroxide, as a lithium raw material, in a molar ratio of 1:1.07, and the mixture was then subjected to a primary heat treatment at 500° C. for 20 hours and a secondary heat treatment at 850° C. for 20 hours in an oxygen atmosphere (oxygen partial pressure of 20%) to prepare a core ($LiNi_{0.6}Co_{0.2}Mn_{0.2}W_{0.005}O_2$).

0.1 part by weight of $H_3BO_3$ was mixed with 100 parts by weight of the above-prepared core using a dry mixer (CYCLOMIX, HOSOKAWA Micron Corporation) and a heat treatment was then performed at 550° C. for 1 hour in an oxygen atmosphere. A positive electrode active material, in which a surface treatment layer including $LiBO_2$ and $Li_2B_4O_7$ (thickness of the surface treatment layer: 150 nm) was formed on the surface of the core, was prepared by the above method.

Example 1-2: Preparation of Positive Electrode Active Material

In a 5 L batch-type reactor set at 60° C., nickel sulfate, cobalt sulfate, manganese sulfate, and tungstic acid, as a tungsten-containing raw material, were mixed in water in a molar ratio of 0.6:0.2:0.2:0.005 to prepare a first metal-containing solution with a concentration of 2M, and nickel sulfate, cobalt sulfate, manganese sulfate, and tungstic acid, as a tungsten-containing raw material, were mixed in water in a molar ratio of 0.4:0.3:0.3:0.005 to prepare a second metal-containing solution with a concentration of 2M. A container containing the first metal-containing solution was connected to the reactor, and a container containing the second metal-containing solution was connected to the container containing the first metal-containing solution. In addition, a 4M NaOH solution and a 7% $NH_4OH$ aqueous solution were prepared and connected to the reactor, respectively.

3 L of deionized water was put in a co-precipitation reactor (capacity 5 L), the reactor was then purged with nitrogen gas at a rate of 2 L/min to remove dissolved oxygen in the water and create a non-oxidizing atmosphere in the reactor. Thereafter, 100 ml of 4M NaOH was added, and stirring was then performed at a speed of 1,200 rpm and a temperature of 60° C. to maintain a pH at 12.0. Subsequently, the first metal-containing solution, the NaOH aqueous solution, and the $NH_4OH$ aqueous solution were respectively added at rates of 180 ml/hr, 180 ml/hr, and 10 ml/hr and reacted for 30 minutes to form precursor seeds. Thereafter, the pH was reduced at a rate of 2 per hour so that the pH was changed to 9.5, and, simultaneously, the second metal-containing solution was added to the container containing the first metal-containing solution at a rate of 150 ml/hr to induce the growth of precursor particles as well as the formation of a concentration gradient in the particle. Thereafter, the reaction was maintained for 24 hours to grow a nickel manganese cobalt-based composite metal hydroxide.

Nickel manganese cobalt-based composite metal hydroxide particles thus formed were mixed with a lithium hydroxide, as a lithium raw material, in a molar ratio of 1:1.07, and the mixture was then subjected to a primary heat treatment at 500° C. for 20 hours and a secondary heat treatment at 850° C. for 20 hours in an oxygen atmosphere (oxygen partial pressure of 20%) to prepare a core ($LiNi_{0.6}Co_{0.2}Mn_{0.2}W_{0.005}O_2$). The resulting core had a concentration gradient in which a concentration of nickel was gradually decreased and concentrations of cobalt and manganese were gradually increased from the center of the particle to the surface thereof.

A surface treatment layer was formed in the same manner as in Example 1-1 except that the above-prepared core was used.

Examples 1-3 to 1-7: Preparation of Positive Electrode Active Materials

Positive electrode active materials were prepared in the same manner as in Example 1-1 except that, instead of $H_3BO_3$ in Example 1-1, materials listed in the following Table 1 were used in the amounts listed.

TABLE 1

| Category | Me raw material | Amount used (part by weight based on 100 parts by weight of the core) | Material generated in surface treatment layer |
|---|---|---|---|
| Example 1-1 | $H_3BO_3$ | 0.1 | $LiBO_2$, $Li_2B_4O_7$ |
| Example 1-2 | $H_3BO_3$ | 0.1 | $LiBO_2$, $Li_2B_4O_7$ |
| Example 1-3 | $WO_3$ | 0.3 | $Li_2WO_4$, $Li_4WO_5$ |
| Example 1-4 | $SiO_2$ | 0.1 | $Li_2SiO_3$ |
| Example 1-5 | $WO_3$, $H_3BO_3$ (mixing weight ratio: 1:1) | 0.4 | $LiBO_2$, $Li_2B_4O_7$, $Li_2WO_4$, $Li_4WO_5$ |
| Example 1-6 | $Al_2O_3$, $H_3BO_3$ (mixing weight ratio: 1:1) | 0.2 | $Al_2O_3$, $LiAlO_2$, $LiBO_2$, $Li_2B_4O_7$ |
| Example 1-7 | $Nb_2O_5$ | 0.3 | $LiNbO_3$ |

Comparative Example 1-1: Preparation of Positive Electrode Active Material

In a 5 L batch-type reactor set at 60° C., nickel sulfate, cobalt sulfate, and manganese sulfate were mixed in water in a molar ratio of 0.6:0.2:0.2 to prepare a metal-containing solution with a concentration of 2M. A container containing the first metal-containing solution was connected to the reactor, and a 4M NaOH solution and a 7% $NH_4OH$ aqueous solution were prepared and connected to the reactor, respectively. 3 L of deionized water was put in a co-precipitation reactor (capacity 5 L), the reactor was then purged with nitrogen gas at a rate of 2 L/min to remove dissolved oxygen in the water and create a non-oxidizing atmosphere in the reactor. Thereafter, 100 ml of 4M NaOH was added, and stirring was then performed at a speed of 1,200 rpm and a temperature of 60° C. to maintain a pH at 12.0. Subsequently, the metal-containing solution, the NaOH aqueous solution, and the $NH_4OH$ aqueous solution were respectively added at rates of 180 ml/hr, 180 ml/hr, and 10 ml/hr and reacted for 24 hours to form a nickel manganese cobalt-based composite metal hydroxide.

Nickel manganese cobalt-based composite metal hydroxide particles thus formed were mixed with a lithium hydroxide, as a lithium raw material, in a molar ratio of 1:1.07, and the mixture was then subjected to a primary heat treatment at 500° C. for 20 hours and a secondary heat treatment at 950° C. for 20 hours in an oxygen atmosphere (oxygen partial pressure of 20%) to prepare a positive electrode active material ($LiNi_{0.6}Co_{0.2}Mn_{0.2}O_2$).

Comparative Example 1-2: Preparation of Positive Electrode Active Material

A positive electrode active material was prepared in the same manner as in Example 1 except that nickel sulfate, cobalt sulfate, manganese sulfate, and tungstic acid, as a tungsten-containing raw material, were mixed in water in a molar ratio of 0.6:0.2:0.2:0.05 and used, nickel manganese cobalt-based composite metal hydroxide particles thus formed were mixed with a lithium hydroxide, as a lithium raw material, in a molar ratio of 1:1.07, and the mixture was then subjected to a primary heat treatment at 500° C. for 20 hours and a secondary heat treatment at 800° C. for 20 hours in an oxygen atmosphere to prepare a core ($LiNi_{0.6}Co_{0.2}Mn_{0.2}W_{0.05}O_2$).

Examples 2-1 to 2-7 and Comparative Examples 2-1 and 2-2: Preparation of Lithium Secondary Batteries Lithium secondary batteries were respectively prepared by using the positive electrode active materials prepared in Examples 1-1 to 1-7 and Comparative Examples 1-1 and 1-2.

Specifically, each of the positive electrode active materials prepared in Examples 1-1 to 1-7 and Comparative Examples 1-1 and 1-2, a carbon black conductive agent, and a PVdF binder were mixed in an N-methylpyrrolidone solvent at a weight ratio of 95:2.5:2.5 to prepare a composition for forming a positive electrode (viscosity: 5,000 mPa·s), and an aluminum current collector was coated with the composition, dried at 130° C., and then rolled to prepared a positive electrode.

Also, as a negative electrode active material, natural graphite, a carbon black conductive agent, and a PVdF binder were mixed in an N-methylpyrrolidone solvent at a weight ratio of 85:10:5 to prepare a composition for forming a negative electrode, and a copper current collector was coated with the composition to prepared a negative electrode.

An electrode assembly was prepared by disposing a porous polyethylene separator between the positive electrode and the negative electrode prepared as described above, and each lithium secondary battery was prepared by disposing the electrode assembly in a case, and then injecting an electrolyte solution into the case. In this case, the electrolyte solution was prepared by dissolving 1.0 M lithium hexafluorophosphate ($LiPF_6$) in an organic solvent composed of ethylene carbonate/dimethyl carbonate/ethylmethyl carbonate (mixing volume ratio of EC/DMC/EMC=3/4/3).

Experimental Example 1: Structural Observation of Positive Electrode Active Material The positive electrode active material prepared in Example 1-1 was processed by ion milling, was observed with a field emission scanning electron microscope (FE-SEM), and thicknesses, volumes, and ratios in the active material of the core and the surface treatment layer were respectively calculated from the observation results. The results thereof are presented in Table 2 below.

TABLE 2

| Category | Radius or thickness (μm) | Volume (μm³) | Ratio (%) |
|---|---|---|---|
| Core | 4.7 | 434.9 | 91 |
| Surface treatment layer | 0.15 | 43.0 | 9 |
| Total | 4.85 | 477.9 | 100 |

As a result of the observation, a surface treatment layer formed on the surface of the core may be identified. Also, a diameter of the positive electrode active material prepared was 9.7 μm, and, in a radius of the positive electrode active material of 4.85 μm, a radius of the core was 4.7 μm and the thickness of the surface treatment layer was 0.15 μm.

Also, as a result of measuring BET specific surface area and tap density, the BET specific surface area of the positive electrode active material prepared in Example 1-1 was 0.61 m$^2$/g and the tap density was 2.35 g/cc. In this case, the BET specific surface area of the positive electrode active material was calculated from a nitrogen gas adsorption amount at a liquid nitrogen temperature (77K) using BELSORP-mini II by Bell Japan Inc., and the tap density was measured by using a powder tester manufactured by Seishin Enterprise, Co., Ltd.

Experimental Example 2: Observation of Grain Diameter of Positive Electrode Active Material Grain diameters of the polycrystalline lithium composite metal oxide particles of Examples 1-1 to 1-3 and Comparative Examples 1-1 and 1-2 were measured by X-ray diffraction (XRD) analysis.

Specifically, about 5 g of each of the polycrystalline lithium composite metal oxide particles of Examples 1-1 to 1-3 and Comparative Examples 1-1 and 1-2 was put in a holder, each diffraction pattern obtained by irradiation of the particles with X-rays was analyzed, and an average grain diameter was then obtained from a full width at half maximum of a main peak or three or more peaks. The results thereof are presented in Table 3 below.

TABLE 3

| Category | Example 1-1 | Example 1-2 | Example 1-3 | Comparative Example 1-1 | Comparative Example 1-2 |
|---|---|---|---|---|---|
| Average grain diameter (nm) | 120 | 104 | 100 | 221 | 45 |

Experimental Example 3: Evaluation of Positive Electrode Active Materials

The coin cells (use Li metal negative electrode), which were prepared by using the positive electrode active materials prepared in Examples 1-1 to 1-3 and Comparative Examples 1-1 and 1-2, were charged at a constant current (CC) of 0.1 C to a voltage of 4.25 V at 25° C., and thereafter, charge in the first cycle was performed by charging the coin cells at a constant voltage (CV) of 4.25 V to a current of 0.05 mAh. After the coin cells were left standing for 20 minutes, the coin cells were discharged at a constant current of 0.1 C to a voltage of 3.0 V to measure discharge capacity in the first cycle. Thereafter, the discharge condition was changed to 2 C, and charge/discharge capacity, charge and discharge efficiency, and rate capability were evaluated, respectively. The results thereof are presented in the following Table 4.

TABLE 4

| | First charge and discharge | | | 2 C. rate | |
|---|---|---|---|---|---|
| Category | Charge capacity (mAh/g) | Discharge capacity (mAh/g) | Charge and discharge efficiency (%) | Capacity (mAh/g) | 2.0 C./ 0.1 C. (%) |
| Example 1-1 | 195.2 | 180.2 | 92.3 | 163.6 | 90.8 |
| Example 1-2 | 194.2 | 178.1 | 91.7 | 161.0 | 90.4 |
| Example 1-3 | 193.6 | 180.4 | 93.2 | 167.1 | 92.6 |
| Comparative Example 1-1 | 192.0 | 175.7 | 91.5 | 157.8 | 89.8 |
| Comparative Example 1-2 | 195.1 | 172.7 | 88.5 | 153.8 | 89.1 |

Form the experimental results, the lithium secondary batteries including the positive electrode active materials of Examples 1-1 to 1-3 had more improvement effects in terms of charge and discharge efficiency, rate capability, and capacity characteristics in comparison to the lithium secondary batteries including the positive electrode active materials of Comparative Examples 1-1 and 1-2.

Experimental Example 4: Evaluation of Battery Characteristics of Lithium Secondary Battery Battery characteristics of the lithium secondary batteries (Examples 2-1 to 2-3 and Comparative Examples 2-1 and 2-2) respectively including the positive electrode active materials of Examples 1-1 to 1-3 and Comparative Examples 1-1 and 1-2 were evaluated by the following method.

Specifically, the lithium secondary batteries were charged and discharged 300 times at a temperature of 25° C. under conditions of 1 C/2 C within a driving voltage range of 2.8 V to 4.15 V.

Also, in order to evaluate output characteristics, resistance was measured by charging the battery, which was charged and discharged at room temperature (25° C.), based on a SOC of 50%, and, at a low temperature (−30° C.), a width of the voltage drop when the current was applied was measured based on a SOC of 50%.

As a result, resistances at room temperature (25° C.) and low temperature (−30° C.), and capacity retention, as a ratio of discharge capacity in a 300$^{th}$ cycle to initial capacity after the 300 cycles of charge and discharge at room temperature, were respectively measured, and the results thereof are presented in Table 5 below.

TABLE 5

| Category | Room temperature (25° C.) resistance (mohm) | Voltage drop (V) at low temperature (−30° C.) | Capacity retention (%) at the 300$^{th}$ cycle at room temperature (25° C.) |
|---|---|---|---|
| Example 2-1 | 1.24 | 0.58 | 98.7 |
| Example 2-2 | 1.27 | 0.61 | 96.5 |
| Example 2-3 | 1.09 | 0.43 | 94.1 |
| Comparative Example 2-1 | 1.54 | 0.79 | 87.3 |
| Comparative Example 2-2 | 1.44 | 0.72 | 89.4 |

From the experimental results, with respect to the lithium secondary batteries using the positive electrode active materials prepared in Examples 2-1 to 2-3, it may be confirmed that the output characteristics at room temperature and low temperature and cycle characteristics were excellent in comparison to Comparative Examples 2-1 and 2-2.

The invention claimed is:

1. A positive electrode active material for a secondary battery, the positive electrode active material comprising:
a core; and
a surface treatment layer disposed on a surface of the core,
wherein the core is a secondary particle including a plurality of primary particles, wherein an average particle diameter ($D_{50}$) of the secondary particle is from 2 µm to 20 µm,
the primary particles comprise a polycrystalline lithium composite metal oxide of Formula 1 having an average grain diameter of 50 nm to 200 nm, and
the surface treatment layer comprises a lithium oxide of Formula 2, $$Li_aNi_{1-x-y}Co_xM1_yM3_zM2_wO_2 \quad \text{[Formula 1]}$$

wherein, in Formula 1, M1 comprises at least one selected from the group consisting of aluminum (Al) and manganese (Mn),
M2 comprises at least one element selected from the group consisting of zirconium (Zr), titanium (Ti), magnesium (Mg), tantalum (Ta), and niobium (Nb),
M3 comprises at least one element selected from the group consisting of tungsten (W), molybdenum (Mo), and chromium (Cr),
$1.0 \leq a \leq 1.5$, $0 < x \leq 0.5$, $0 < y \leq 0.5$, $0.002 \leq z \leq 0.03$, $0 \leq w \leq 0.02$, and $0 < x+y \leq 0.7$, $$Li_mMe_nO_{(m+By)/2} \quad \text{[Formula 2]}$$

wherein, in Formula 2,
Me comprises at least one element selected from the group consisting of boron (B), tungsten (W), hafnium (Hf), niobium (Nb), tantalum (Ta), molybdenum (Mo), silicon (Si), tin (Sn), and zirconium (Zr),
$1 \leq m \leq 10$, $1 \leq n \leq 10$, and B is an oxidation number of the Me.

2. The positive electrode active material for a secondary battery of claim 1, wherein the lithium oxide comprises one selected from the group consisting of $LiBO_2$, $Li_2B_4O_7$, $Li_2WO_4$, $Li_4WO_5$, and $Li_6WO_6$, or a mixture of two or more thereof.

3. The positive electrode active material for a secondary battery of claim 1, wherein inside of the core is doped with the Me of the lithium oxide, and the Me has a concentration gradient that decreases from the surface of the core to the inside thereof.

4. The positive electrode active material for a secondary battery of claim 1, wherein at least one metallic element of the nickel, the M1, and the cobalt has a concentration gradient that changes in the core.

5. The positive electrode active material for a secondary battery of claim 1, wherein the nickel, the M1, and the cobalt each independently have a concentration gradient that changes across the entire core,
a concentration of the nickel is decreased while the nickel has a concentration gradient from a center of the core in a surface direction, and
concentrations of the cobalt and the M1 are increased while the cobalt and the M1 each independently have a concentration gradient from the center of the core in the surface direction.

6. The positive electrode active material for a secondary battery of claim 1, wherein the M1 is manganese (Mn).

7. The positive electrode active material for a secondary battery of claim 1, wherein the surface treatment layer is formed on 25% or more to less than 100% of a total surface area of the core.

8. The positive electrode active material for a secondary battery of claim 1, wherein the surface treatment layer has an average thickness ratio of 0.01 to 0.1 based on a radius of the core.

9. The positive electrode active material for a secondary battery of claim 1, wherein the positive electrode active material has a Brunauer-Emmett-Teller (BET) specific surface area of 0.5 m$^2$/g to 1.9 m$^2$/g.

10. The positive electrode active material for a secondary battery of claim 1, wherein the positive electrode active material has a tap density of 1.7 g/cc to 2.5 g/cc.

11. A positive electrode for a secondary battery, the positive electrode comprising the positive electrode active material of claim 1.

12. A lithium secondary battery comprising the positive electrode of claim 11.

13. A method of preparing the positive electrode active material for a secondary battery of claim 1, the method comprising:
preparing a core including a polycrystalline lithium composite metal oxide of Formula 1 by reacting a nickel raw material, a cobalt raw material, a M1 raw material, a M3 raw material, and a lithium raw material, wherein, M1 comprises at least one selected from the group consisting of aluminum (Al) and manganese (Mn), and M3 comprises at least one element selected from the group consisting of tungsten (W), molybdenum (Mo), and chromium (Cr)); and
performing a surface treatment on the core using a composition including a lithium oxide of Formula 2, or performing a heat treatment after mixing the core with a precursor of the lithium oxide of Formula 2, $$Li_aNi_{1-x-y}Co_xM1_yM3_zM2_wO_2 \quad \text{[Formula 1]}$$

wherein, in Formula 1, M1 comprises at least one selected from the group consisting of Al and Mn, M2 comprises at least one element selected from the group consisting of Zr, titanium (Ti), magnesium (Mg), Ta, and Nb, M3 comprises at least one element selected from the group consisting of W, Mo, and Cr, $1.0 \leq a \leq 1.5$, $0 < x \leq 0.5$, $0 < y \leq 0.5$, $0.002 \leq z \leq 0.03$, $0 \leq w \leq 0.02$, and $0 < x+y \leq 0.7$, $$Li_mMe_nO_{(m+By)/2} \quad \text{[Formula 2]}$$

wherein, in Formula 2,
Me comprises at least one element selected from the group consisting of boron (B), tungsten (W), hafnium (Hf), niobium (Nb), tantalum (Ta), molybdenum (Mo), silicon (Si), tin (Sn), and zirconium (Zr),
$1 \leq m \leq 10$, $1 \leq n \leq 10$, and B is an oxidation number of the Me.

14. The method of claim 13, wherein the core is prepared by a preparation method comprising:
mixing the nickel raw material, the cobalt raw material, and the M1 raw material, wherein, M1 comprises at least one element selected from the group consisting of aluminum (Al) and manganese (Mn) to prepare a metal-containing solution;
adding an ammonium cation-containing complexing agent and a basic compound to the metal-containing solution and performing a reaction to prepare a precursor; and mixing the precursor with the lithium raw material and performing primary sintering at 500° C. to 700° C. and secondary sintering at 700° C. to 900° C., wherein the M3 raw material is further added during the preparation of the metal-containing solution or the mixing of the precursor with the lithium raw material.

15. The method of claim 14, wherein a metal-containing solution including a nickel raw material, a cobalt raw material, and a M1 raw material in a concentration different from that of the metal-containing solution is further added during the preparation of the precursor.

16. The method of claim 14, wherein the primary sintering and the secondary sintering are each independently performed in an air or oxygen atmosphere.

\* \* \* \* \*